（12） United States Patent
Asada et al.

(10) Patent No.: US 11,821,832 B2
(45) Date of Patent: Nov. 21, 2023

(54) ANTICORROSION TEST METHOD AND ANTICORROSION TEST EQUIPMENT FOR COATED METALLIC MATERIAL

(71) Applicant: Mazda Motor Corporation, Hiroshima (JP)

(72) Inventors: Teruaki Asada, Hiroshima (JP); Katsunobu Sasaki, Hiroshima (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 386 days.

(21) Appl. No.: 17/199,491

(22) Filed: Mar. 12, 2021

(65) Prior Publication Data

US 2021/0325295 A1 Oct. 21, 2021

(30) Foreign Application Priority Data

Apr. 15, 2020 (JP) .................................. 2020-073084

(51) Int. Cl.
  *G01N 17/02* (2006.01)
  *G01N 27/26* (2006.01)

(52) U.S. Cl.
  CPC ............. *G01N 17/02* (2013.01); *G01N 27/26* (2013.01)

(58) Field of Classification Search
  CPC ........................................... G01N 17/02
  See application file for complete search history.

(56) References Cited

FOREIGN PATENT DOCUMENTS

| JP | 2007-271501 A | 10/2007 | |
| JP | 2016-050915 A | 4/2016 | |
| JP | 2016-050916 A | 4/2016 | |
| JP | 2019032172 A | * 2/2019 | ............. G01N 17/00 |

OTHER PUBLICATIONS

JPO machine-generated English language translation of patent application JP 2017-151619, which issued as JP 2019-032172 A, published Feb. 28, 2019. (Year: 2019).*
Collins online English dictionary definition of "probatively", downloaded May 29, 2023 (Year: 2023).*

* cited by examiner

*Primary Examiner* — Alexander S Noguerola
(74) *Attorney, Agent, or Firm* — XSENSUS LLP

(57) ABSTRACT

An anticorrosion test method for a coated metallic material may include: a preparation step of adding an artificial flaw at two positions of the coated metallic material; a first measurement step of measuring a size of the artificial flaw; a connection step of electrically connecting the artificial flaws at the two positions by an external circuit via water-containing materials; an energization step of energizing a steel sheet to produce a bulge of an electrodeposition coating film; a second measurement step of measuring size of the bulge of the electrodeposition coating film; a calculation step of calculating a degree of progress of corrosion of the coated metallic material; and a correction step of correcting the degree of the progress of the corrosion.

16 Claims, 6 Drawing Sheets

ANTICORROSION TEST METHOD AND ANTICORROSION TEST EQUIPMENT FOR COATED METALLIC MATERIAL

CROSS-REFERENCE TO RELATED APPLICATION

The present application claims priority to Japanese patent application JP 2020-073084, filed Apr. 15, 2020, the entire contents of which being incorporated herein by reference in its entirety.

TECHNICAL FIELD

The present disclosure relates to an anticorrosion test method and anticorrosion test equipment for a coated metallic material.

BACKGROUND ART

Conventionally, as a method for evaluating coating film performance, an accelerated corrosion test such as a cyclic corrosion test or a salt spray test has been conducted.

However, it takes several months to obtain an evaluation result of such an accelerated corrosion test. Thus, it is difficult to easily evaluate a constituent material of a coated steel sheet and properties of the coating films, each of which has a different baking condition, to promptly optimize a coating condition, and the like. For this reason, establishment of a quantitative evaluation method, which allows prompt and easy evaluation of corrosion resistance of the coated steel sheet, has been desired in fields of material development, process control at a paint plant, and quality control related to anti-rusting of a vehicle.

Meanwhile, in Patent document 1, as a method for evaluating corrosion resistance of a film that is coated on a surface of a metallic member, the following method is described. The method includes: immersing the metallic member and a counter electrode member in water or an electrolyte fluid; electrically connecting a negative terminal side of a measuring power supply to the metallic member and a positive terminal side thereof to the counter electrode member; and evaluating anticorrosion performance of the film on the basis of an oxygen diffusion limit current from the counter electrode member to the metallic member through the film.

In Patent document 2, the following method is described. The method includes: arranging an electrode on a film surface side of a painted metallic material via an electrode material; applying a voltage between a base material and the film surface of the painted metallic material; and evaluating corrosion resistance of the painted metallic material on the basis of a voltage value at the time when electric breakdown of the film occurs.

In Patent document 3, the following method is described. The method includes: arranging an electrode on a coating film surface side of a painted metallic material via an electrode material; causing the electrode material to permeate a coating film of the painted metallic material; applying a voltage between a base material and the film surface of the painted metallic material; and evaluating corrosion resistance of the painted metallic material on the basis of a value related to a current that flows in conjunction with the application of the voltage.

PRIOR ART DOCUMENTS

Patent Documents

[Patent document 1] JP-A-2007-271501
[Patent document 2] JP-A-2016-50915
[Patent document 3] JP-A-2016-50916

SUMMARY

Problems to be Solved

Although the corrosion resistance of the painted metallic material can be evaluated by the anticorrosion test methods described in Patent documents 1 to 3, establishment of an anticorrosion test, with which a highly reliable evaluation result can be obtained, is desired.

The inventors of the present application have focused on a point that corrosion of the coated metallic material progresses due to a flaw in a surface-treated film of a metallic base material, and has already filed a patent application of an electrochemical anticorrosion test method, for which such corrosion is simulated (JP 2019-032171 and the like).

Compared to the anticorrosion test methods described in Patent documents 1 to 3, such a method is simple and reliable. However, when influences of size, a shape, and the like of the artificial flaw on the test result are taken into consideration, there is still room for improvement in a point of reinforcement of versatility.

Therefore, the present disclosure has a purpose, among others, of providing an anticorrosion test method and anticorrosion test equipment for a coated metallic material, such a method and equipment being simple, highly reliable, and versatile.

Means for Solving the Problems

In order to solve the above problem and other problems, an anticorrosion test method for a coated metallic material disclosed herein according to some embodiments of the present disclosure is an anticorrosion test method for a coated metallic material in which a surface-treated film is provided to the metallic base material. The anticorrosion test method may include: a preparation step of adding an artificial flaw that penetrates the surface-treated film and reaches the metallic base material at two mutually-separated positions in the coated metallic material; a first measurement step of measuring size of the artificial flaw; a connection step of electrically connecting the artificial flaws at the two positions by an external circuit via water-containing materials, each of which is in contact with respective one of the artificial flaws; an energization step of energizing the metallic base material by the external circuit so as to produce a bulge of the surface-treated film in at least one of the artificial flaws at the two positions; a second measurement step of measuring size of the bulge of the surface-treated film; a calculation step of calculating a degree of progress of corrosion of the coated metallic material in relation to one of the artificial flaws at the two positions having the larger bulge of the surface-treated film on the basis of the size of the artificial flaw, which is measured in the first measuring step, and the size of the bulge of the surface-treated film, which is measured in the second measurement step; and a correction step of correcting the degree of the progress of the corrosion of the coated metallic material, which is calculated in the calculation step, on the basis of the size of the artificial flaw having the larger bulge of the surface-treated film and correlation between the size of the artificial flaw calculated probatively in advance and the degree of the progress of the corrosion of the coated metallic material.

It has been known that corrosion of metal progresses when anode reaction (oxidation reaction), in which the metal contacting water is dissolved (ionized) to produce liberated electrons, and cathode reaction (reduction reaction), in which dissolved oxygen in water produces a hydroxyl group $OH^-$ with the liberated electrons, simultaneously occur.

In this configuration, since the artificial flaws at the two positions in the coated metallic material are electrically connected by the external circuit via the water-containing materials, each of the artificial flaws becomes a reaction site of at least one of the anode reaction and the cathode reaction. In the artificial flaw, in which the anode reaction progresses, the metal in the metallic base material is dissolved, and the electrons are produced. In the artificial flaw, in which the cathode reaction progresses, the electrons, which are produced by the anode reaction, flows into the artificial flaw via the metallic base material, and thus the cathode reaction progresses. Then, in the artificial flaw, in which the cathode reaction progresses, hydrogen and $OH^-$ are produced by water permeated into the surface-treated film, dissolved oxygen, and reaction with ionized $H^+$ in water, and hydrogen is produced by electrolysis of water. These types of the reaction in the artificial flaw resemble acceleration of actual corrosion of the coated metallic material.

In the artificial flaw, in which the anode reaction progresses, the metal in the metallic base material is ionized and dissolved into the water-containing material, and the electrons are liberated to the metallic base material side. This reaction is not generated alone, and reaction to receive the liberated electrons is required, which is the cathode reaction.

The artificial flaw in which the cathode reaction progresses becomes alkaline environment due to production of $OH^-$. In this way, base treatment (chemical conversion coating) on a surface of the metallic base material is damaged to degrade adhesiveness of the surface-treated film (in the case where the base treatment is not conducted, the adhesiveness between the metallic base material and the surface-treated film is simply degraded), and the bulge of surface-treated film is produced. In addition, the electrolysis of water and hydrogen gas, which is produced by a reduction of $H^+$, promote bulging of the surface-treated film. Accordingly, when a degree of bulging of the surface-treated film in the artificial flaw, in which the cathode reaction progresses, is checked, it is possible to measure the degree of the progress of the corrosion of the coated metallic material.

In the case where the artificial flaw, in which the cathode reaction progresses, varies in size, a degree of progress of electrolysis reaction of water, which progresses in the artificial flaw, a degree of closure of the artificial flaw by swelling of the surface-treated film, a degree of defoaming of the hydrogen gas, which is produced in the bulge of the surface-treated film, and the like vary. As a result, the size of the bulge of the surface-treated film also varies, which degrades the reliability of the anticorrosion test. However, it is difficult to form the artificial flaws in the exactly same size in order to suppress occurrence of such variations.

In this configuration, in the correction step, the degree of the progress of the corrosion of the coated metallic material, which is calculated in the calculation step, is corrected on the basis of the size of the artificial flaw, which is measured in the first measurement step, and the correlation between the size of the artificial flaw, which is calculated probatively in advance, and the degree of the progress of the corrosion of the coated metallic material. In this way, the degree of the progress of the corrosion of the coated metallic material can be evaluated with the high degree of accuracy regardless of the size of the artificial flaw, in which the cathode reaction progresses, prior to the energization. As a result, it is possible to improve the reliability and the versatility of the anticorrosion test.

In one embodiment, in the energization step, of the artificial flaws at the two positions, one thereof is an anode site, and the other thereof is a cathode site, and the artificial flaw having the larger bulge of the surface-treated film is the artificial flaw that is the cathode site.

In the case where the artificial flaws are formed at the two mutually separated positions, it is desired that one thereof is the site in which the anode reaction progresses, that is, the anode site, and the other thereof is the site in which the cathode reaction progresses, that is, the cathode site.

Since the anode reaction progresses at the anode site, the bulge of the surface-treated film is hardly produced as described above. Meanwhile, since the cathode reaction progresses at the cathode site, the bulge of the surface-treated film is produced as described above.

According to this configuration, since the degree of the progress of the corrosion can be calculated on the basis of the size of the artificial flaw as the cathode site prior to the energization and the size of the bulge of the surface-treated film.

In one embodiment, the degree of the progress of the corrosion is a growth rate of the bulge of the surface-treated film, and in the calculation step, the growth rate of the bulge of the surface-treated film is calculated on the basis of the size of the artificial flaw, which is measured in the first measuring step, the size of the bulge of the surface-treated film, which is measured in the second measurement step, and energization information in the energization step in relation to one of the artificial flaws at the two positions having the larger bulge of the surface-treated film.

The growth rate of the bulge of the surface-treated film in the artificial flaw, in which the cathode reaction progresses, corresponds to a rate of the growth of the corrosion. Accordingly, when the growth rate of the bulge of the surface-treated film is acquired as the degree of the progress of the corrosion of the coated metallic material, the highly-reliable anticorrosion test can be conducted. In the present specification, the "energization information" means information on a current value, a voltage value, an energization time, and the like at the time of the energization.

In one embodiment, a shape of the artificial flaw having the larger bulge of the surface-treated film is a dotted shape in a plan view.

In the present specification, the "dotted shape" is a shape of a circle, a polygon, or the like in a plan view, and is a shape, a ratio of which between a maximum width and a minimum width is 2 or less. The maximum width of the artificial flaw is referred to as a "diameter".

According to this configuration, the surface-treated film can be bulged efficiently in a dome shape in conjunction with the corrosion, and thus promotion of the corrosion can be improved.

Optionally, in the first measuring step, a diameter of the artificial flaw is measured as the size of the artificial flaw.

According to this configuration, the size of the artificial flaw can be measured with the high degree of accuracy.

Optionally, the diameter of the artificial flaw is the diameter of the artificial flaw, and is equal to or larger than 0.1 mm and equal to or smaller than 5 mm.

In regard to the diameter of the artificial flaw, in which the cathode reaction progresses (an exposed diameter of the metallic base material), when such a diameter becomes too small, an energization property is degraded, which inhibits progress of the cathode reaction. Meanwhile, when the diameter thereof becomes too large, the cathode reaction becomes unstable, which degrades reproducibility of the acceleration of the corrosion. When the diameter of the artificial flaw is set within the above range, it is possible to simultaneously promote the cathode reaction and improve the reproducibility of the acceleration of the corrosion.

A distance between the artificial flaws at the two positions is optionally equal to or longer than 2 cm and is further optionally equal to or longer than 3 cm from a perspective of ease of checking of the bulge of the surface-treated film.

As the coated metallic material that is suited for the anticorrosion test, for example, a painted metallic material in which a resin coating film as the surface-treated film is provided to the metallic base material is available. In such a painted metallic material, the bulge of the coating film is likely to be promoted between the metallic base material and the resin coating film, which improves the reliability of the anticorrosion test.

The metallic base material may be a steel material constituting a home appliance, a construction material, an automotive part or the like, for example, a cold-rolled steel sheet (SPC), an alloyed hot dip galvanized steel sheet (GA), the high-tensile steel sheet, a hot stamp material, or a light alloy material. The chemical film (a phosphate film (for example, a zinc phosphate film), a chromate film, or the like) may be formed on the surface of the metallic base material.

More specifically, for example, as the resin coating film, cationic electrodeposition coating films (base coating films) of an epoxy resin system, an acrylic resin system, and the like are available. In addition, the resin coating film may be a laminated coating film in which a top coating film is superposed on the electrodeposition coating film, a laminated coating film in which a middle coating film and the top coating film are superposed on the electrodeposition coating film, or the like.

In order to energize the metallic base material, the external circuit can include the electrode at each end thereof, and the electrode is provided in an immersed state into the water-containing material. A carbon electrode, a platinum electrode, or the like can be used as such an electrode. In particular, the perforated electrode having at least one through hole that opposes the surface-treated film can be adopted, and the perforated electrode is optionally substantially arranged in parallel with the surface-treated film. For example, the perforated electrode has a ring shape having the through hole at a center, and the through hole is provided in a manner to oppose the artificial flaw. Alternatively, a mesh electrode may be adopted as the perforated electrode, and the mesh electrode in the immersed state into the water-containing material may be arranged to be substantially parallel to the surface-treated film.

In one embodiment, the energization is conducted in constant current control, and the current value in the constant current control can be set to be optionally equal to or higher than 10 µA and equal to or lower than 10 mA. Due to the constant current control in which the current value is set within the above range, it is possible to simultaneously reduce the test time and improve the reliability of the test.

In one embodiment, the water-containing material is a muddy substance and is possibly provided to a surface of the surface-treated film in each of the artificial flaws at the two positions. The water-containing material may contain water, a supporting electrolyte, and a clay mineral. The supporting electrolyte may be at least one type of salt selected from sodium chloride, sodium sulfate, and calcium chloride. The clay mineral is a layer silicate mineral or zeolite. The layer silicate mineral may be at least one selected from kaolinite, montmorillonite, sericite, illite, glauconite, chlorite, and talc.

In the connection step, the water-containing material may be held for one minute or longer and one day or shorter in the state of being arranged on the surface of the surface-treated film. According to this configuration, it is possible to promote the permeation of the water-containing material into the surface-treated film in advance. In this way, it is possible to reduce the test time and improve the reliability of the anticorrosion test.

Anticorrosion test equipment for a coated metallic material disclosed herein according to some embodiments of the present disclosure is anticorrosion test equipment for a coated metallic material in which a surface-treated film is provided to a metallic base material, and may include: an external circuit that electrically connects artificial flaws, which are artificially added at two mutually-separated positions in the coated metallic material, penetrate the surface-treated film, and reach the metallic base material, via water-containing materials, each of which is in contact with respective one of the artificial flaws; energization means that energizes the metallic base material by the external circuit so as to produce a bulge of the surface-treated film in at least one of the artificial flaws at the two positions; first measurement means that measures size of the artificial flaw; second measurement means that measures size of the bulge of the surface-treated film; calculation means that calculates a degree of progress of corrosion of the coated metallic material in relation to one of the artificial flaws at the two positions having the larger bulge of the surface-treated film on the basis of the size of the artificial flaw, which is measured by the first measurement means, and the size of the bulge of the surface-treated film, which is measured by the second measurement means; and correction means that corrects the degree of the progress of the corrosion of the coated metallic material, which is calculated by the calculation means, on the basis of the size of the artificial flaw having the larger bulge of the surface-treated film and correlation between the size of the artificial flaw calculated probatively in advance and the degree of the progress of the corrosion of the coated metallic material.

In the case where the artificial flaw, in which the cathode reaction progresses, varies in size, a degree of progress of electrolysis reaction of water, which progresses in the artificial flaw, a degree of closure of the artificial flaw by swelling of the surface-treated film, a degree of defoaming of the hydrogen gas, which is produced in the bulge of the surface-treated film, and the like vary. As a result, the size of the bulge of the surface-treated film also varies, which degrades the reliability of the anticorrosion test. However, it is difficult to form the artificial flaws in the exactly same size in order to suppress occurrence of such variations.

In this configuration, the correction means is used to correct the degree of the progress of the corrosion of the coated metallic material, which is calculated by the calculation means, on the basis of the size of the artificial flaw having the larger bulge of the surface-treated film and the correlation between the size of the artificial flaw calculated probatively in advance and the degree of the progress of the corrosion of the coated metallic material. In this way, the degree of the progress of the corrosion of the coated metallic material can be evaluated with the high degree of accuracy regardless of the size of the artificial flaw, in which the cathode reaction progresses, prior to the energization. As a result, it is possible to improve the reliability and the versatility of the anticorrosion test.

In one embodiment, the first measurement means and/or the second measurement means can be constructed of: detection means for acquiring image data of a surface of the coated metallic material, that is, a surface of the surface-treated film; and a controller that is connected to this detection means. Examples of the detection means are a camera, a digital microscope, an optical microscope, and an electron microscope. The image data that is acquired by the detection means is sent to the controller. The controller is configured to measure the size of the artificial flaw and/or the size of the bulge of the surface-treated film on the image data. According to this configuration, since the image data that is acquired by the detection means is used, it is possible to measure the size of the artificial flaw and/or the size of the bulge of the surface-treated film with the high degree of accuracy.

In one embodiment, the correlation is a correction coefficient that corresponds to the size of the artificial flaw.

When the correction coefficient corresponding to the size of the artificial flaw is calculated in advance as the correlation, the correction can easily be made. In this way, it is possible to conduct the highly-reliable and versatile anticorrosion test with a simple configuration.

Advantage of the Disclosure

In some embodiments of the present disclosure, in the correction step, the degree of the progress of the corrosion of the coated metallic material, which is calculated in the calculation step, is corrected on the basis of the size of the artificial flaw, which is measured in the first measurement step, and the correlation between the size of the artificial flaw, which is calculated probatively in advance, and the degree of the progress of the corrosion of the coated metallic material. In this way, the degree of the progress of the corrosion of the coated metallic material can be evaluated with the high degree of accuracy regardless of the size of the artificial flaw, in which the cathode reaction progresses, prior to the energization. As a result, it is possible to improve the reliability and the versatility of the anticorrosion test.

MODES FOR CARRYING OUT THE DISCLOSURE

A description will hereinafter be made on modes for carrying out the present disclosure with reference to the drawings. The following description on preferred embodiments is essentially and merely illustrative and thus has no intention to limit the present disclosure, application subjects thereof, and application thereof. The specific features, structures, materials or characteristics described in any embodiments may be included or recombined in any suitable manner in any one or more other embodiments or examples.

First Embodiment

Figure 1:
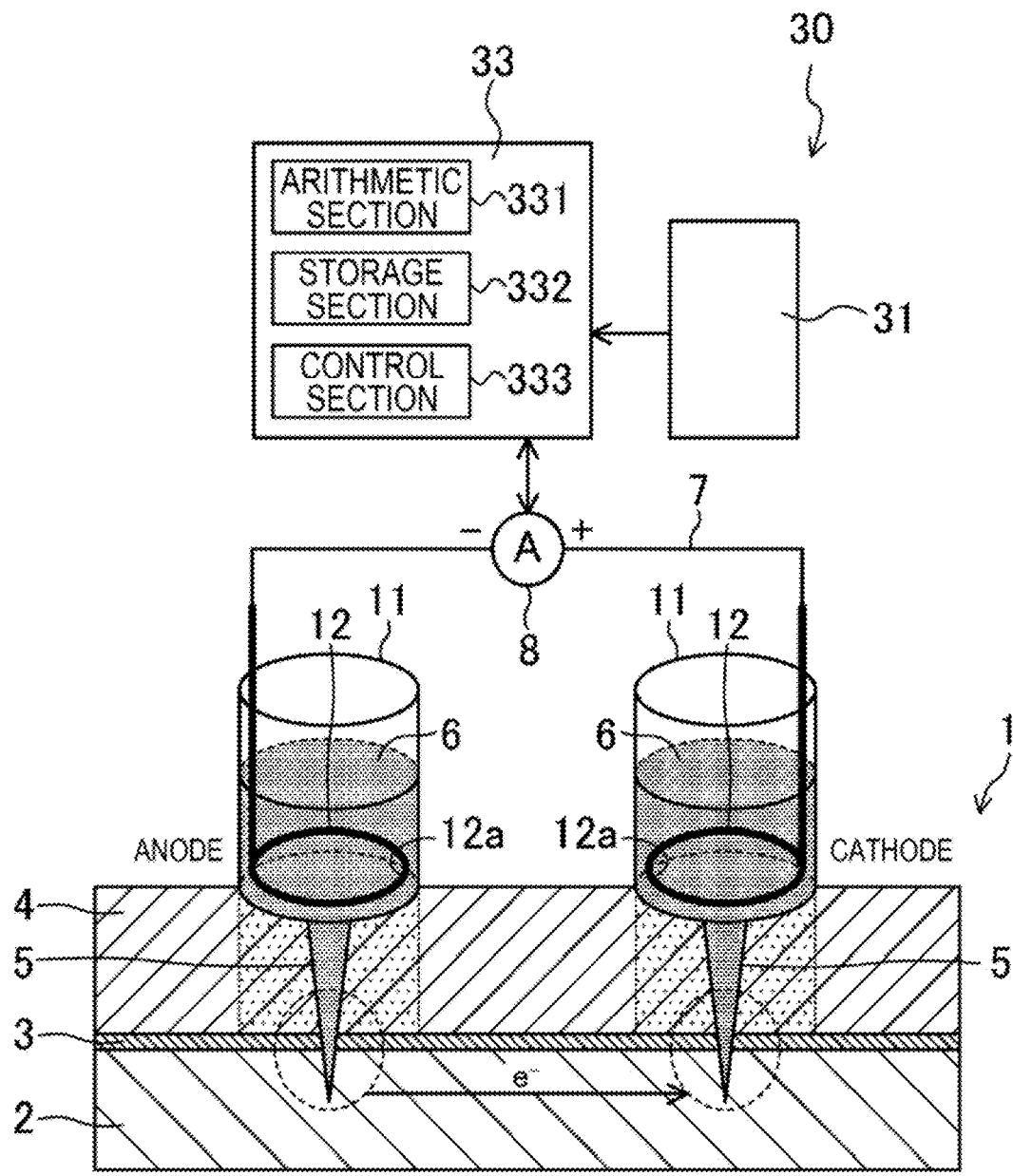
FIG. 1 is a view illustrating a principle of an anticorrosion test and anticorrosion test equipment according to one embodiment of the present disclosure.

FIG. 1 illustrates an example of a principle of an anticorrosion test method and anticorrosion test equipment according to this embodiment. FIG. 1 illustrates a coated metallic material 1 and anticorrosion test equipment 30.

In the coated metallic material 1 in this embodiment, a metallic base material is formed with a chemical film 3 on a surface of a steel sheet 2 and is provided with an electrodeposition coating film 4 (a resin coating film) as a surface-treated film.

In the coated metallic material 1, an artificial flaw 5 that penetrates the electrodeposition coating film 4 and the chemical film 3 and reaches the steel sheet 2 is added at two mutually-separated positions.

<Anticorrosion Test Equipment>

As illustrated in FIG. 1, anticorrosion test equipment 30 according to this embodiment includes a cylinder 11, an external circuit 7, energization means 8, a camera 31 (first measurement means, second measurement means, detection means), and a controller 33 (the first measurement means, the second measurement means, calculation means, correction means). FIG. 1 illustrates a state of connection step S3, which will be described below.

—Cylinder—

The cylinder 11 having a larger diameter than the artificial flaw 5 is provided in a coaxial manner with the artificial flaw 5 in portions at the two positions at each of which the artificial flaw 5 of the coated metallic material 1 is formed. The cylinder 11 is provided to accommodate and keep a water-containing material 6 on a surface of the electrodeposition coating film 4. The water-containing material 6 is in contact with the surface of the electrodeposition coating film 4 in a state of being accommodated in the cylinder 11, and enters the artificial flaw 5.

The water-containing material 6 is a muddy substance that contains water, a supporting electrolyte, and a clay mineral, and has a function as a conductive material. Since the water-containing material 6 is the muddy substance that contains the clay mineral, in connection step S3 and energization step S4, which will be described below, permeation of ions and water in the water-containing material into the electrodeposition coating film 4 around the artificial flaw 5 is promoted.

The supporting electrolyte is salt and provides sufficient electrical conductivity to the water-containing material 6. More specifically, for example, as the supporting electrolyte, at least one type of salt selected from sodium chloride, sodium sulfate, calcium chloride, calcium phosphate, potassium chloride, potassium nitrate, potassium hydrogen tartrate, and magnesium sulfate can be adopted. As the supporting electrolyte, at least one type of salt selected from sodium chloride, sodium sulfate, and calcium chloride can further optionally be adopted. A contained amount of the supporting electrolyte in the water-containing material 6 is optionally equal to or higher than 1% by mass and equal to or lower than 20% by mass, is further optionally equal to or higher than 3% by mass and equal to or lower than 15% by mass, and especially optionally equal to or higher than 5% by mass and equal to or lower than 10% by mass.

The clay mineral makes the water-containing material 6 muddy, promotes movement of the ions and the permeation of water into the electrodeposition coating film 4, and thereby promotes corrosion. As the clay mineral, for example, a layer silicate mineral or zeolite can be adopted. As the layer silicate mineral, for example, at least one selected from kaolinite, montmorillonite, sericite, illite, glauconite, chlorite, and talc can be adopted, and especially optionally, kaolinite can be adopted. A contained amount of the clay mineral in the water-containing material 6 is optionally equal to or higher than 1% by mass and equal to or lower than 70% by mass, is further optionally equal to or higher than 10% by mass and equal to or lower than 50% by mass, and especially optionally equal to or higher than 20% by mass and equal to or lower than 30% by mass. The water-containing material 6 is the muddy substance. Thus, even in the case where the electrodeposition coating film 4 is not horizontal, the water-containing material 6 can be provided onto the surface of the electrodeposition coating film 4.

The water-containing material 6 may contain an additive other than water, the supporting electrolyte, and the clay mineral. More specifically, examples of the additive are organic solvents such as acetone, ethanol, toluene, and methanol. In the case where the water-containing material 6 contains the organic solvent, a contained amount of the organic solvent is optionally equal to or higher than 5% and equal to or lower than 60% as a volume ratio to water. Such a volume ratio is equal to or higher than 10% and equal to or lower than 40% and is further optionally equal to or higher than 20% and equal to or lower than 30%.

—External Circuit—

In some embodiments, the external circuit 7 electrically connects portions having the artificial flaws 5 at the two positions in the coated metallic material 1 via the water-containing materials 6. An electrode 12 is provided at each end of the external circuit 7, and the electrode 12 is provided in an immersed state to the water-containing material 6 in the cylinder 11. Although there is no intention of limitation, a carbon electrode, a platinum electrode, or the like can be used as the electrode 12, for example.

In some embodiments, the electrode 12 is a ring-shaped perforated electrode that has a through hole 12a at a center, and is arranged in parallel with the electrodeposition coating film 4 such that the through hole 12a opposes the artificial flaw 5 and is coaxial with the artificial flaw 5.

In the energization step S4, which will be described below, hydrogen gas is possibly produced in the artificial flaw 5. Since the electrode 12 has the through hole 12a, the hydrogen gas flows out of the through hole 12a. Thus, the hydrogen gas is avoided from remaining in a portion between the electrode 12 and the electrodeposition coating film 4. In this way, degradation of an energization property is avoided.

—Energization Means—

In some embodiments, the energization means or instrument 8 energizes the steel sheet 2 by the external circuit 7 and is constructed of a constant direct-current source. As the energization means 8, a galvanostat can be adopted, for example. The energization means 8 is connected to the controller 33 electrically or wirelessly. The energization means 8 is subject to constant current control by the controller 33. Energization information such as a current value applied to the external circuit 7 by the energization means 8 and an energization time is sent to the controller 33. The current value is controlled to be optionally equal to or higher than 10 µA and equal to or lower than 10 mA, further optionally equal to or higher than 100 µA and equal to or lower than 5 mA, and especially optionally equal to or higher than 500 µA and equal to or lower than 2 mA. When the current value is lower than 10 µA, acceleration of the corrosion is reduced, and consequently, it takes a long time for the test. Meanwhile, when the current value exceeds 10 mA, a corrosion reaction rate becomes unstable, which degrades a correlation between the diameter of the artificial flaw 5 and actual progress of the corrosion. When the current value is set within the above range, it is possible to simultaneously reduce the test time and improve reliability of the test.

—Camera—

In some embodiments, the camera 31 is a device that captures an image of a surface of the coated metallic material 1, and is a CCD camera or the like, for example. The camera 31 is connected to the controller 33 electrically or wirelessly. The image that is captured by the camera 31, that is, image data is sent to the controller 33. In a first measurement step S2 and a second measurement step S5, which will be described below, the camera 31 captures an image of the artificial flaw 5 (see FIG. 3 and FIG. 4) prior to the energization step S4 and an image of a bulge of the electrodeposition coating film 4 around the artificial flaw 5 after the energization step S4.

—Controller—

In some embodiments, the controller 33 is a device that is based on a well-known microcomputer or processor circuitry, for example, and includes an arithmetic section 331 (the calculation means, the correction means), a storage section 332 that stores various types of data, and a control section 333 that outputs a control signal on the basis of a result by the arithmetic section 331 and the like to execute various types of control. Although not illustrated, the controller 33 may include an input sections that are a display section such as a display, a keyboard, and the like. The storage section 332 stores information such as the various types of the data and an arithmetic processing program. The arithmetic section 331 executes various types of arithmetic processing on the basis of the information stored in the storage section 332, information input via the input section, and the like. Based on an arithmetic result of the arithmetic section 331, the control section 333 outputs the control signal to a control target and executes the various types of the control.

As described above, the controller 33 is connected to the energization means 8 and the camera 31 electrically or wirelessly. As described above, the energization information, such as the current value applied to the external circuit 7 by the energization means 8 and the energization time, the image data captured by the camera 31, and the like are sent to the controller 33 and are stored in the storage section 332. In addition, the control section 333 outputs the control signal to the energization means 8 and controls the current value that is applied to the external circuit 7 by the energization means 8. The controller 33 may be configured to output the control signal to the camera 31 and control imaging timing and the like by the camera 31.

Based on the image data of the surface of the coated metallic material 1 that is stored in the storage section 332, the arithmetic section 331 measures the diameter as size of the artificial flaw 5 in the first measurement step S2, which will be described below, and size of the bulge of the electrodeposition coating film 4 around the artificial flaw 5 in the second measurement step S5, which will be described below.

In addition, in each of a calculation step S6 and a correction step S7, which will be described below, the arithmetic section 331 calculates and corrects a degree of the progress of the corrosion of the coated metallic material 1.

<Anticorrosion Test Method>

Figure 2:
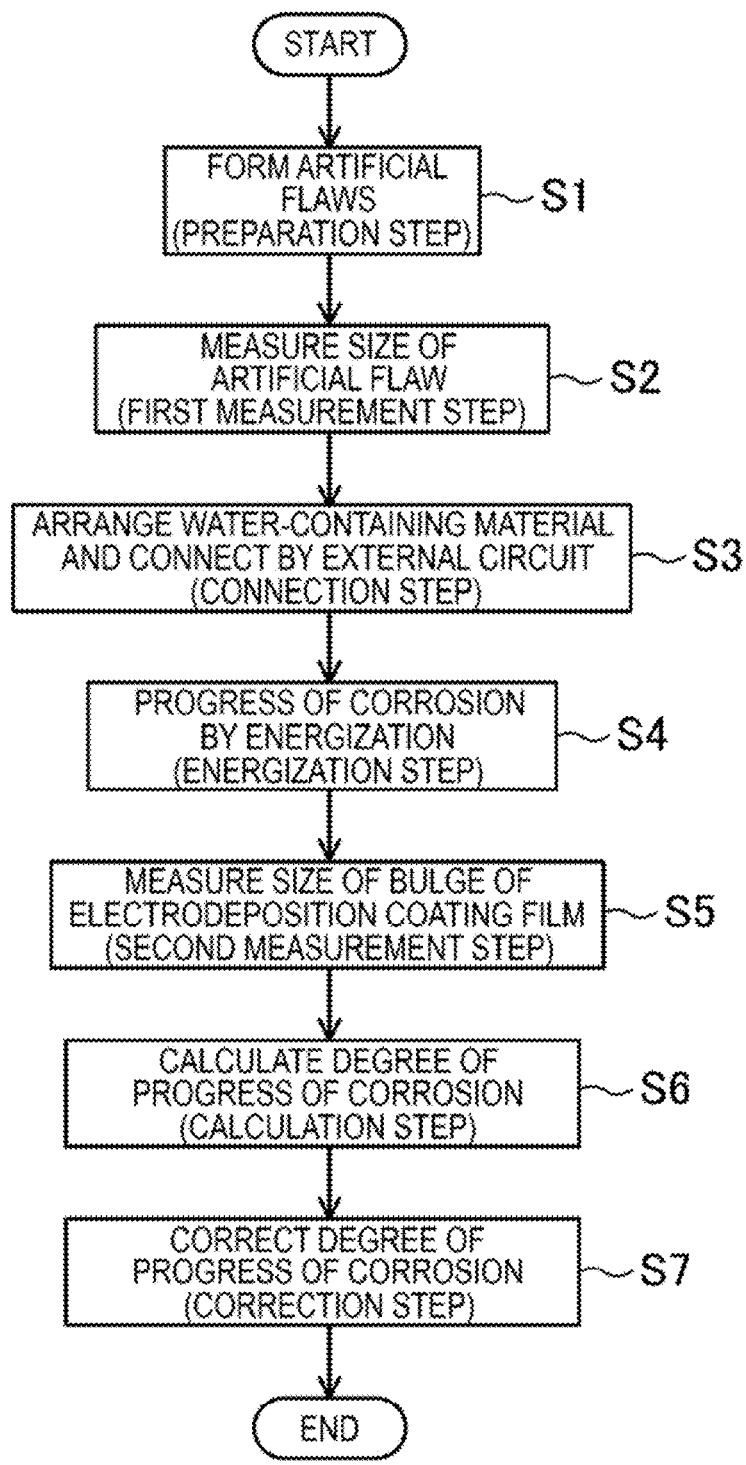
FIG. 2 is a flowchart for illustrating an anticorrosion test method according to one embodiment of the present disclosure.

As illustrated in FIG. 2, the anticorrosion test method according to this embodiment includes a preparation step S1, the first measurement step S2, the connection step S3, the energization step S4, the second measurement step S5, the calculation step S6, and the correction step S7. A description will hereinafter be made on each of the steps.

—Preparation Step—

In the preparation step S1, the artificial flaw 5, which penetrates the electrodeposition coating film 4 and the chemical film 3 and reaches the steel sheet 2, is artificially added at the two mutually-separated positions in the coated metallic material 1.

In general, the corrosion of the coated metallic material including the coating film starts, for example, when a corrosion factor such as salt water permeates the coating film and reaches the base material. Accordingly, a corrosion process of the coated metallic material is divided into a process prior to occurrence of the corrosion and a process of growth of the corrosion. Each of these processes can be evaluated by calculating a period until the start of the corrosion (a corrosion suppression period) and a rate of the growth of the corrosion (a corrosion growth rate).

When the artificial flaw 5, which penetrates the electrodeposition coating film 4 and the chemical film 3 and reaches the steel sheet 2, is added, the portion to which the artificial flaw 5 is added starts rusting. Accordingly, by adding the artificial flaw 5, of the corrosion processes of the coated metallic material 1, a state where the process prior to the occurrence of the corrosion is terminated, that is, a state at termination of the corrosion suppression period can be created in a simulation.

Of the artificial flaws 5 at the two positions, at least one thereof is desirably formed in a dotted shape. The "dotted shape" is a shape of a circle, a polygon, or the like in a plan view, and is a shape, a ratio of which between a maximum width and a minimum width is 2 or less. In addition, in this preparation step S1, the artificial flaw 5 that produces the larger bulge of the electrodeposition coating film 4 in the second measurement step S5, which will be described below, is optionally formed in the dotted shape. Furthermore, the artificial flaw 5, cathode reaction of which progresses in the energization step S4, which will be described below, that is, the artificial flaw 5 as a cathode site is optionally formed in the dotted shape. In this case, the shape of the artificial flaw 5 as an anode site is not particularly limited. Such a shape may be the dotted shape or may be a linear shape such as a cutter scar, for example.

A type of a tool that makes the artificial flaw 5 is not particularly limited. In the case where the dotted artificial flaw 5 is formed, for example, a method using an automated flawing punch, a method using a Vickers hardness tester to make the flaw with a specified load by an indenter, or the like is preferred in order to prevent variations in the size and a depth of the artificial flaw 5, that is, from a perspective of making the flaw quantitatively. In the case where the artificial flaw 5 is formed in the shape other than the dotted shape, for example, the above-described linear shape, a cutter or the like may be used.

Figure 3:
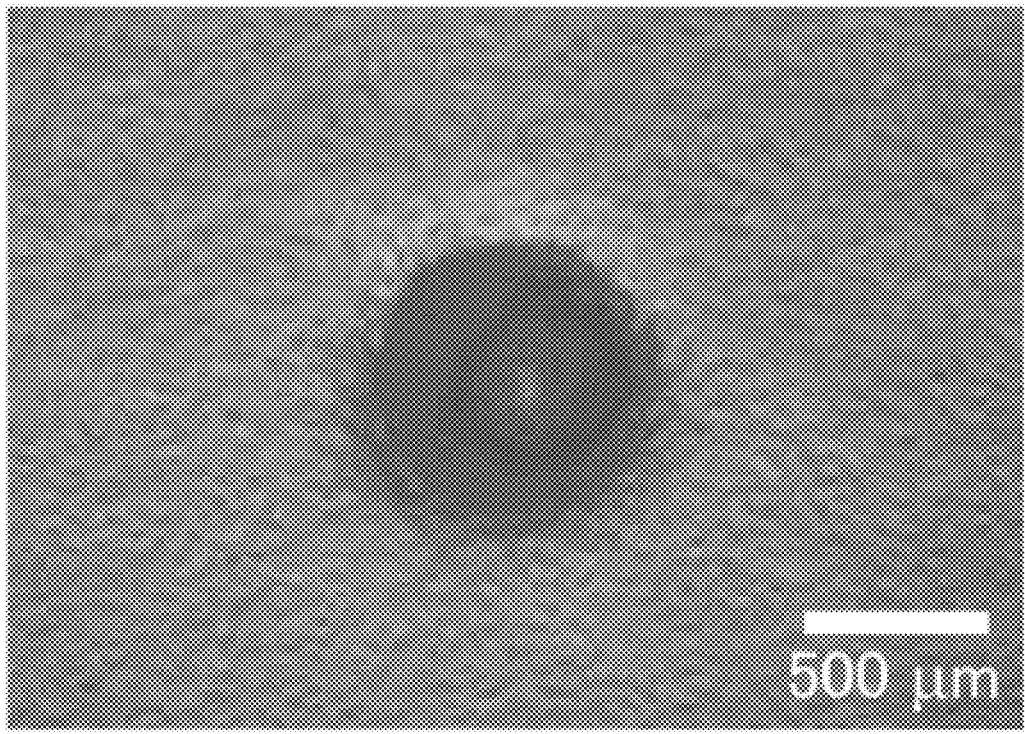
FIG. 3 is an image obtained by a digital microscope, the image showing an example of an artificial flaw according to one embodiment of the present disclosure.

FIG. 3 illustrates an example of the dotted artificial flaw that is formed by the automated flawing punch (RACODON 206G). The artificial flaw in FIG. 3 has the circular shape in the plan view. Since the artificial flaw 5 is in the dotted shape, the electrodeposition coating film 4 can be bulged in a dome shape effectively in association with the corrosion, and thus promotion of the corrosion can be improved.

A distance between the artificial flaws 5 at the two positions is optionally equal to or longer than 2 cm and is further optionally equal to or longer than 3 cm from a perspective of ease of checking of the bulges of the electrodeposition coating film 4.

—First Measurement Step—

The first measurement step S2 is a step of measuring the size of the artificial flaw 5. The size of the artificial flaw 5 is the diameter or a surface area of the artificial flaw 5, and is optionally the diameter thereof. For example, in the case where the shape of the artificial flaw 5 is the circular shape in the plan view, the surface area of the artificial flaw 5 can be acquired as an area of a circle. In this embodiment, the size of the artificial flaw 5 is assumed to be equal to size of an exposed portion of the steel sheet 2.

Figure 4:
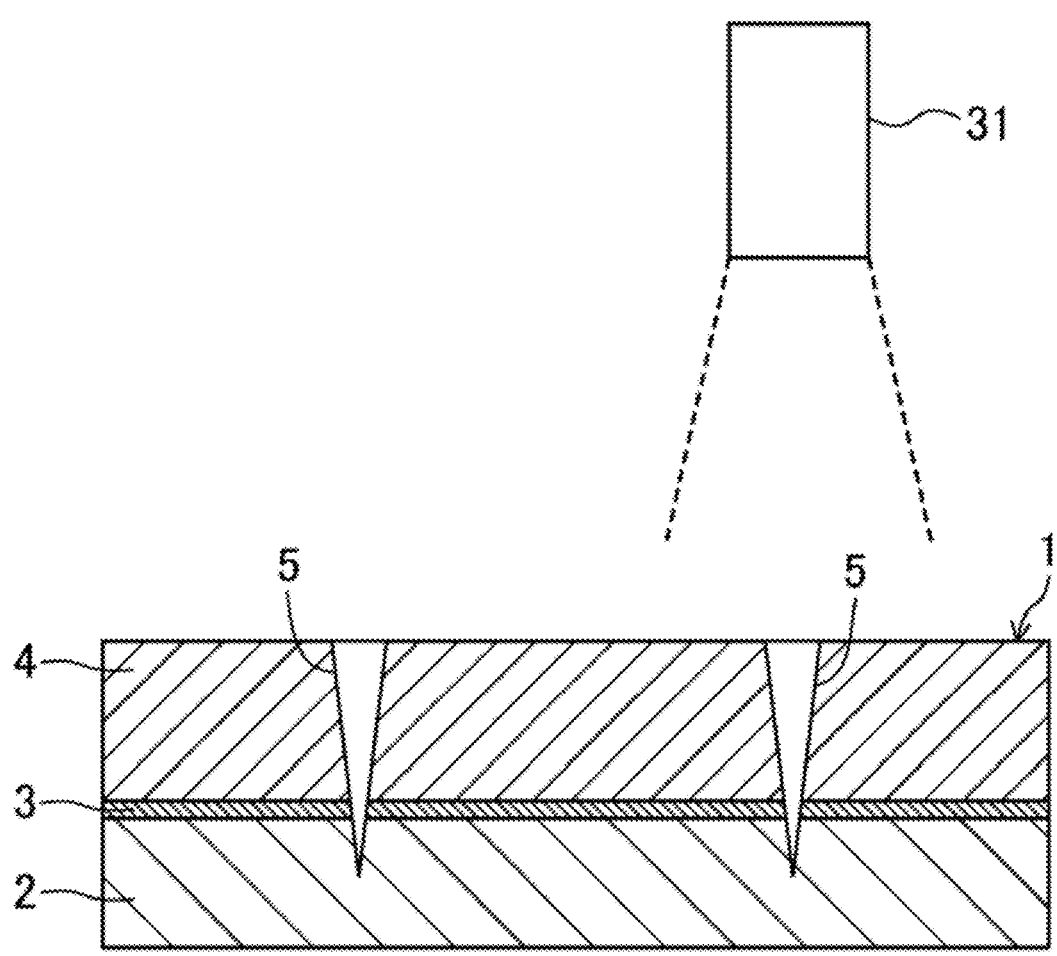
FIG. 4 is a view for illustrating a first measurement step according to one embodiment of the present disclosure.

More specifically, as illustrated in FIG. 4, the above-described camera 31 is used to capture an image of a portion around the artificial flaw 5 on the surface of the electrodeposition coating film 4. Then, on the acquired image data, the arithmetic section 331 measures the size of the artificial flaw 5.

Both of the artificial flaws 5 at the two positions may be measured, or only the artificial flaw 5 as the cathode site in the energization step S4 may be measured.

In the case where the shape of the artificial flaw 5 is the dotted shape, the diameter of the artificial flaw 5, in particular, the diameter of the artificial flaw 5 as the cathode site can be optionally equal to or larger than 0.1 mm and equal to or smaller than 5 mm (the surface area of the artificial flaw 5 is equal to or larger than 0.01 $mm^2$ and equal to or smaller than 25 $mm^2$), further optionally equal to or larger than 0.15 mm and equal to or smaller than 2.0 mm, and especially optionally equal to or larger than 0.2 mm and equal to or smaller than 1.5 mm.

As will be described below, in the above optional range, as the diameter becomes smaller, the acceleration of the corrosion is increased. However, when the diameter becomes smaller than 0.1 mm, the energization property is degraded, which hinders the cathode reaction. Meanwhile, when the diameter becomes larger than 5 mm, the cathode reaction becomes unstable, which hinders bulging of the electrodeposition coating film 4, which will be described below. When the diameter of the artificial flaw 5 is set within the above range, the progress of the cathode reaction and the bulge of the electrodeposition coating film 4 is promoted.

—Connection Step—

The connection step S3 is a step of electrically connecting the artificial flaws 5 at the two positions by the external circuit 7 via the water-containing materials 6, which are in contact with the artificial flaws 5.

More specifically, for example, first, the cylinder 11 that surrounds respective one of the artificial flaws 5 at the two positions is set on the electrodeposition coating film 4 of the coated metallic material 1, and the muddy water-containing material 6 in a specified amount is poured into the cylinder 11. At this time, the cylinder 11 is optionally provided in the coaxial manner with the artificial flaw 5. Next, the ring-shaped electrode 12, which is provided at each of the ends of the external circuit 7, is placed in the cylinder 11 in the immersed state in the water-containing material 6. At this time, the electrode 12 is optionally provided to be parallel with the surface of the electrodeposition coating film 4 and coaxial with the artificial flaw 5. Although not illustrated in FIG. 1, an annular rubber mat for preventing leakage of the fluid may be arranged between the cylinder 11 and the electrodeposition coating film 4.

From what have been described so far, the water-containing material 6, which is included in the cylinder 11, is brought into a state of being in contact with the surface of the electrodeposition coating film 4 of entering the artificial flaw 5. Then, the artificial flaws 5 at the above two positions are brought into an electrically connected state by the external circuit 7 via the water-containing materials 6, which are in contact with the artificial flaws 5.

Prior to the next energization step S4, the water-containing material 6 may be held for a specified time in a state of being arranged on the surface of the electrodeposition coating film 4. The specified time, that is, a holding time is optionally equal to or longer than one minute and equal to or shorter than one day, further optionally equal to or longer than 10 minutes or equal to or shorter than 120 minutes, and especially optionally equal to or longer than 15 minutes and equal to or shorter than 60 minutes.

When the water-containing material 6 is held in the state of being arranged on the surface of the electrodeposition coating film 4, it is possible to urge the permeation of the water-containing material 6 into the electrodeposition coating film 4 in advance. That is, as illustrated by dotted patterns in FIG. 1, the movement of the ions and the permeation of water into the electrodeposition coating film 4 can be promoted in advance. This corresponds to simulated recreation of the state where the corrosion suppression period is terminated in the form resembling the actual corrosion process. In this way, the corrosion of the chemical film 3 and the steel sheet 2 can smoothly be progressed in the next energization step S4, and the growth of the bulge of the electrodeposition coating film 4 can be promoted to evaluate the corrosion growth rate, which represents the process of the growth of the corrosion. As a result, it is possible to simultaneously reduce the test time and improve the reliability of the anticorrosion test.

From a perspective of further promoting the movement of the ions and the permeation of water into the electrodeposition coating film 4, it is desired that a temperature of the coated metallic material 1 and/or the water-containing material 6 is optionally set to be equal to or higher than 30° C. and equal to or lower than 100° C., further optionally set to be equal to or higher than 50° C. and equal to or lower than 100° C., and especially optionally set to be equal to or higher than 50° C. and equal to or lower than 80° C. More specifically, for example, in FIG. 1, it can be configured that the temperature of the coated metallic material 1 and/or the water-containing material 6 is regulated by arranging a hot plate or the like on a lower side of the coated metallic material 1, by wrapping the cylinder 11 with a rubber heater or a film heater, or the like. It can also be configured that the temperature of only one of the coated metallic material 1 and the water-containing material 6 is regulated. Alternatively, a temperature of the entire unit may be regulated in a furnace.

—Energization Step—

In some embodiments, the energization step S4 is a step of energizing the steel sheet 2 by the external circuit 7 such that the bulge is produced from at least one of the artificial flaws 5 at the two positions on the electrodeposition coating film 4.

More specifically, the energization means 8 is actuated, and the external circuit 7 energizes the steel sheet 2 of the coated metallic material 1 via the electrodes 12, the water-containing materials 6, and the electrodeposition coating film 4. This energization is subject to the constant current control such that the current value is constant within the above-described range.

In the case where the energization is not conducted, it is considered that, similar to the normal corrosion process, the anode reaction and the cathode reaction simultaneously and slowly progress in each of the artificial flaws 5 at the two positions, and the corrosion progresses in each of the anode and the cathode.

In this embodiment, due to conduction of the above energization, the anode reaction (Fe→$Fe^{2+}$+2$e^-$), in which Fe in the steel sheet 2 elutes, mainly progresses in one (a left side in FIG. 1) of the artificial flaws 5 at the two positions, and the one artificial flaw 5 is connected to a negative electrode side of the energization means 8. That is, the one artificial flaw 5 is the anode site. Electrons $e^-$ that are generated by elution reaction of Fe at the anode site move to the other artificial flaw 5 (a right side in FIG. 5), which is connected to a positive electrode side of the energization means 8, through the steel sheet 2. Then, the electrons $e^-$ are released into the water-containing material 6 from the other artificial flaw 5, and the cathode reaction, in which dissolved oxygen in water is reduced to produce a hydroxyl group $OH^-$, mainly progresses. That is, the other artificial flaw 5 is the cathode site.

On the anode site, since $e^-$ is supplied to the water-containing material 6 from the electrode 12, dissolved oxygen in the water-containing material 6 is reduced, electrolysis of water occurs, and thus $OH^-$ is produced. $Fe^{2+}$ that elutes at the anode site is attracted to the electrode 12 and reacts with OH– to form ferric hydroxide. In addition, as described above, the electrons $e^-$, which are produced at the anode site, move to the cathode site. Accordingly, at the anode site, while the anode reaction progresses, the cathode reaction is suppressed. As a result, alkaline environment is not produced around the artificial flaw 5 at the anode site. Thus, the chemical film 3 is less likely to be damaged, and adhesiveness of the electrodeposition coating film 4 is maintained. At the anode site, the bulge of the electrodeposition coating film 4 is hardly produced.

Meanwhile, at the cathode site, the electrons $e^-$, which have moved from the anode site, reacts with water and dissolved oxygen in the water-containing material 6 to produce $OH^-$ ($H_2O$+½ $O_2$+2$e^-$→2$OH^-$). In addition, due to reaction between ionized hydrogen ions in the water-containing material 6 and the electrons e–, hydrogen is produced (2$H^+$+2$e^-$→$H_2$). In this way, the cathode reaction progresses. Hydrogen is also produced by the electrolysis of water.

Since the cathode site becomes alkalic (produces $OH^-$), the chemical film 3 is dissolved, and adhesion of the electrodeposition coating film 4 to the steel sheet 2 is degraded. Then, since the hydrogen gas is produced, the bulge is produced on the electrodeposition coating film 4, and the corrosion of the steel sheet 2 progresses from the portion corresponding to the artificial flaw 5 to a portion therearound.

That is, the progress of the bulge of the electrodeposition coating film 4 at the cathode site corresponds to simulated recreation of the progress of the corrosion of the coated metallic material 1. Accordingly, when the size of the bulge of the electrodeposition coating film 4 at a time point at which the specified time elapses from initiation of the energization, the degree of the progress of the corrosion of the coated metallic material 1 can be evaluated.

Figure 5:
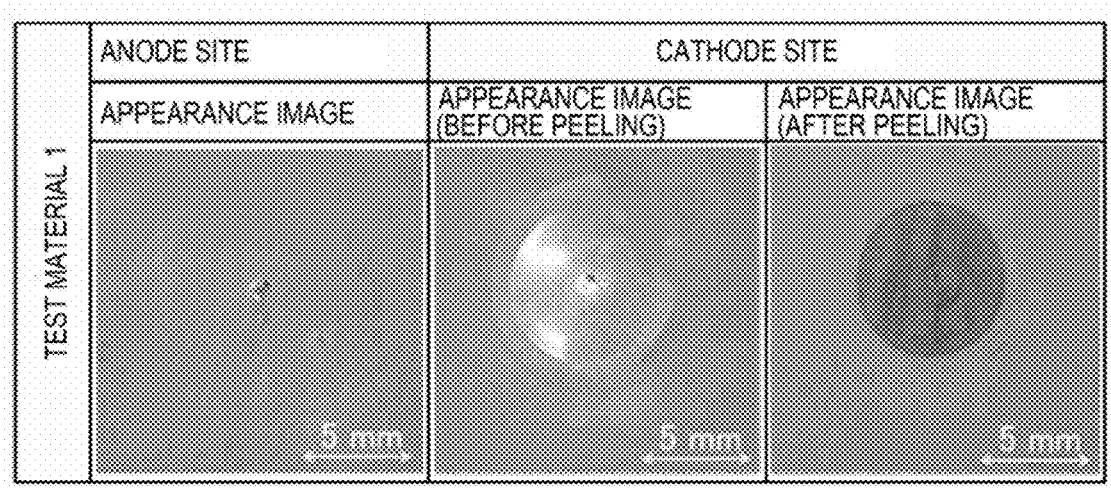
FIG. 5 includes images of artificial flaws after the anticorrosion test of a test material according to one embodiment of the present disclosure.

More specifically, FIG. 5 illustrates external appearance images of an anode site and a cathode site of a test material 1 after the anticorrosion test, which will be described later. Here, the external appearance image (before peeling) is an image of the surface of the coated metallic material 1 after the test. The external appearance image is an image of the surface of the coated metallic material 1, from which the bulged electrodeposition coating film 4 is peeled by an adhesive tape, after the test. Although the formation of the artificial flaw 5 can be checked at the anode site, the bulge of the electrodeposition coating film 4 can hardly be observed. Meanwhile, at the cathode site, the artificial flaw 5 and the bulge of the electrodeposition coating film 4, which is formed around the artificial flaw 5, are observed.

Depending on conditions such as the size, the shape, and the like of the artificial flaw 5 as well as the current value during the energization by the energization means 8, and the like, the progress of the cathode reaction at the anode site may not be suppressed sufficiently. That is, in this embodiment, it is preferred that the artificial flaws at the two positions are clearly divided into the artificial flaw 5, in which the anode reaction progresses, and the artificial flaw 5, in which the cathode reaction progresses. However, these artificial flaws 5 may not be divided clearly. In this case, also at the anode site, the bulge of the electrodeposition coating film 4 possibly progresses. In such a case, the bulge of the electrodeposition coating film 4 possibly progresses in both of the artificial flaws 5 at the two positions. Thus, in the calculation step S6, which will be described below, the degree of the progress of the corrosion of the coated metallic material 1 is calculated on the basis of the artificial flaw 5 in which the bulge of the electrodeposition coating film 4 is larger.

Due to the energization by the external circuit 7, a voltage is applied to the water-containing material 6 at each of the anode site and the cathode site. Thus, negative ions ($Cl^-$ or the like) and positive ions ($Na^+$ or the like) in the water-containing material 6 move toward the steel sheet 2 through the electrodeposition coating film 4. Then, these negative ions and positive ions causes water to permeate the electrodeposition coating film 4.

In addition, since the electrode 12 is arranged to surround the artificial flaw 5, the voltage is stably applied to the electrodeposition coating film 4 around the artificial flaw 5. As a result, the movement of the ions to the electrodeposition coating film 4 and the permeation of water into the electrodeposition coating film 4 at the energization occur efficiently.

In this way, at each of the anode site and the cathode site, the permeation of the ions and water into the portion of the electrodeposition coating film 4 around the artificial flaw 5 is promoted by the energization, which promptly brings a flow of electricity into a stable state. Thus, the growth of the bulge of the electrodeposition coating film 4 in the artificial flaw 5 is stabilized.

As described above, in this embodiment, the artificial flaws 5 are divided by the energization into the site at which the anode reaction progresses and the site at which the cathode reaction progresses. In addition, the progress of these types of reaction in each of the artificial flaws and the growth of the bulge of the electrodeposition coating film 4 can stably be promoted. Therefore, it is possible to conduct the anticorrosion test of the coated metallic material 1 in an extremely short time with the high degree of accuracy.

The energization time in the energization step may be equal to or longer than 0.05 hour and equal to or shorter than 24 hours, for example, from a perspective of sufficiently expanding the bulge of the coating film. The energization time is optionally equal to or longer than 0.1 hour and equal to or shorter than 10 hours and further optionally equal to or longer than 1 hour and equal to or shorter than 5 hours.

—Second Measurement Step—

In some embodiments, the second measurement step S5 is a step of measuring the size of the bulge of the electrodeposition coating film 4.

In the case where the diameter of the artificial flaw 5 is measured as the size thereof in the above-described first measurement step S2, the size of the bulge of the electrodeposition coating film 4 is acquired by measuring a diameter of a circle (hereinafter referred to as a "bulge diameter") around the artificial flaw 5 in the state shown in the external appearance image (before peeling) of the cathode site in FIG. 5, for example, and the circle appears due to the bulge of the electrodeposition coating film 4. Alternatively, as shown in the external appearance image (after peeling) of the cathode site in FIG. 5, the size of the bulge of the electrodeposition coating film 4 may optionally be acquired by adhering the adhesive tape to the electrodeposition coating film 4 after the anticorrosion test, peeling a bulged portion of the electrodeposition coating film 4, and measuring a diameter of an exposed surface (hereinafter referred to as a "peel diameter") of the exposed steel sheet 2.

More specifically, in the second measurement step S5, the camera 31 is used to capture the image of the portion around the artificial flaw 5 after peeling. Then, on the acquired image data, the arithmetic section 331 measures the bulge diameter or the peel diameter.

In the calculation step S6, which will be described below, the bulge diameter or the peel diameter, which is used to calculate the degree of the progress of the corrosion, is the bulge diameter or the peel diameter of the artificial flaw 5 having the larger bulge of the electrodeposition coating film 4 than the other.

Accordingly, in the second measurement step S5, in the case where, of the artificial flaws 5 at the two positions, the bulge of the electrodeposition coating film 4 in the one artificial flaw 5 is clearly larger than the bulge of the electrodeposition coating film 4 in the other artificial flaw 5, only the bulge diameter or the peel diameter of the artificial flaw 5 having the larger bulge of the electrodeposition coating film 4 may be measured. More specifically, for example, as illustrated in FIG. 5, in the case where the bulge of the electrodeposition coating film 4 at the cathode site is clearly larger than the bulge of the electrodeposition coating film 4 at the anode site, only the image of the cathode site may be captured to measure the bulge diameter or the peel diameter.

In the case where the bulges of both of the electrodeposition coating films 4 are substantially the same in size, the images of both of the anode site and the cathode site may be captured to measure the bulge diameters or the peel diameters. Then, the larger bulge diameter or the larger peel diameter may be selected from measurement results.

In the case where the surface area of the artificial flaw 5 is adopted as the size thereof in the above-described first measurement step S2, a surface area of the bulge of the electrodeposition coating film 4 is favorably adopted as the size thereof.

—Calculation Step—

In some embodiments, in the calculation step S6, the degree of the progress of the corrosion of the coated metallic material 1 is calculated.

As described above, the growth of the bulge of the electrodeposition coating film 4 is observed at the time point at which the specified time elapses from the initiation of the energization in the energization step S4. In this way, the degree of the progress of the corrosion of the coated metallic material 1 can be acquired.

Examples of an index indicative of the degree of the progress of the corrosion are a difference between the size of the artificial flaw 5, which is measured in the first measurement step S2, and the size of the bulge of the electrodeposition coating film 4, which is measured in the second measurement step S5, and a growth rate of the bulge of the electrodeposition coating film 4. Here, such an index is optionally the growth rate of the bulge of the electrodeposition coating film 4. This is because the growth rate of the bulge of the electrodeposition coating film 4 corresponds to the above-described corrosion growth rate.

A procedure for calculating the growth rate of the bulge of the electrodeposition coating film 4 as the degree of the progress of the corrosion is executed as follows, for example. Based on the diameter of the artificial flaw 5, which is measured in the first measurement step S2, having the larger bulge of the electrodeposition coating film 4 than the other among the artificial flaws 5 at the two positions and the bulge diameter or the peel diameter thereof, which is measured in the second measurement step S5, a distance by which the bulge of the electrodeposition coating film 4 grows during the energization is calculated. Then, based on this growth distance and the energization time in the energization step S4, the rate at which the bulge of the electrodeposition coating film 4 grows is calculated.

—Correction Step—

In the case where the artificial flaws 5, in each of which the cathode reaction progresses, vary in size prior to the energization step S4, a degree of progress of electrolysis reaction of water, which progresses in each of the artificial flaw 5, a degree of closure of each of the artificial flaws 5 by swelling of the electrodeposition coating film 4, a degree of defoaming of the hydrogen gas, which is produced in the bulge of the electrodeposition coating film 4, and the like vary. As a result, the size of the bulge of the electrodeposition coating film 4 also varies, which degrades the reliability of the anticorrosion test. However, it is difficult to always form the artificial flaws 5 in the exactly same size in order to suppress occurrence of such variations.

This embodiment is characterized that the degree of the progress of the corrosion, which is calculated in the calculation step S6, is corrected on the basis of the size of the artificial flaw 5 prior to the energization step S4.

More specifically, for example, in the correction step S7, the degree of the progress of the corrosion of the coated metallic material 1, which is calculated in the calculation step S6, is corrected on the basis of the diameter of the artificial flaw 5, which is measured in the first measurement step S2, and correlation between the diameter of the artificial flaw 5, which is calculated probatively in advance, and the degree of the progress of the corrosion of the coated metallic material 1.

Figure 6:
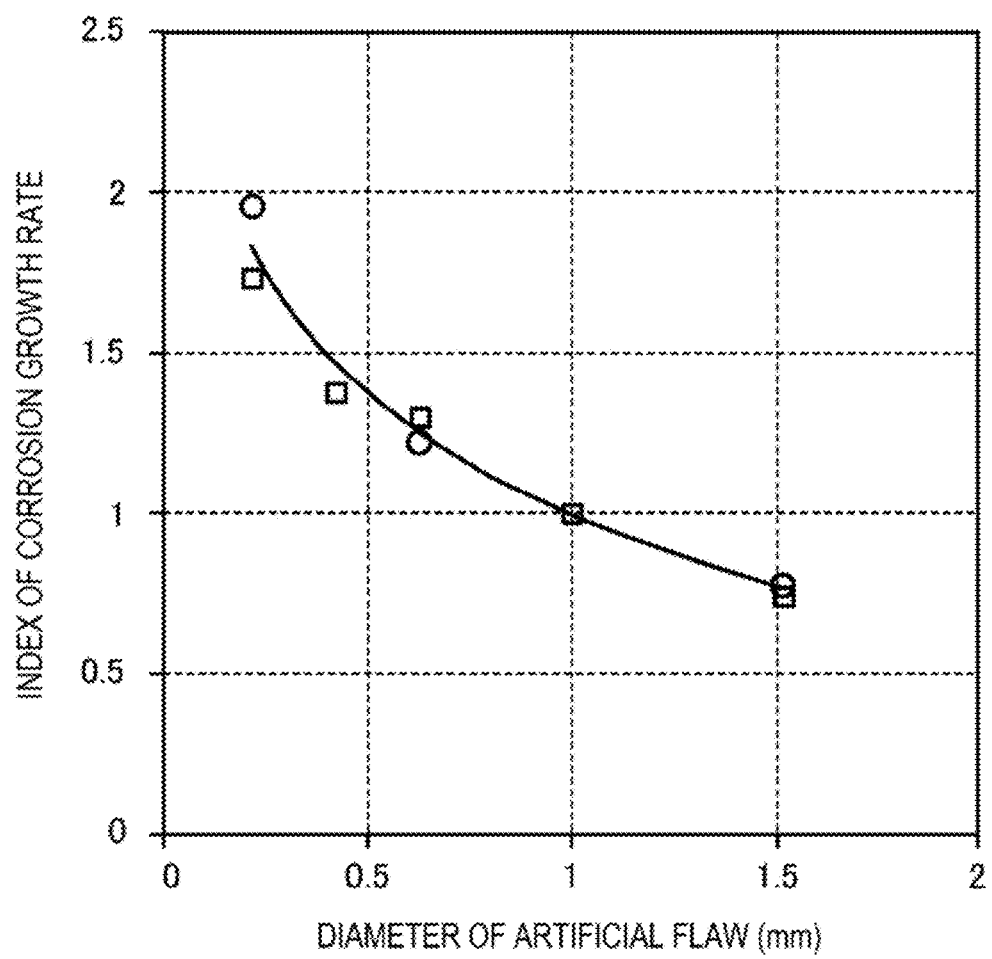
FIG. 6 is a graph illustrating a relationship between a diameter of an artificial flaw in each of test materials and an index of a corrosion growth rate according to one embodiment of the present disclosure.

A description will be made on a case where the growth rate of the bulge of the electrodeposition coating film 4, that is, the corrosion growth rate is adopted as the degree of the progress of the corrosion as an example. FIG. 6 is a graph illustrating a relationship between the diameter of the artificial flaw 5 in each of test materials 2, 3 in the anticorrosion test, which will be described below, and an index of the corrosion growth rate. The "index of the corrosion growth rate" is a ratio between the corrosion growth rate and the corrosion growth rate at the time when the diameter of the artificial flaw 5 is 1 mm.

As illustrated in FIG. 6, in each of the test materials 2, 3, the corrosion growth rate is increased with a reduction in the diameter of the artificial flaw 5 from 1.5 mm to 0.2 mm. This indicates that the acceleration of the corrosion is increased as the diameter of the artificial flaw 5 is reduced. In other words, when the diameter of the artificial flaw 5 is increased, the corrosion growth rate is reduced, that is, the acceleration of the corrosion is reduced. It is considered that a main cause therefor is an increase in the area of the exposed portion of the steel sheet 2, which is caused by the increase in the diameter of the artificial flaw 5. When the area of the exposed portion of the steel sheet 2 is increased, the electrochemical reaction (generation of the hydrogen gas due to the reduction of the hydrogen ions) in the exposed surface of the steel sheet 2, which has no direct correlation with the bulge of the electrodeposition coating film 4, is possibly increased, and a consumed amount of electrical energy that is supplied from the energization means 8 is possibly increased.

When a regression formula is calculated from results of the test materials 2, 3, a curve ($R^2=0.97$) indicated by a solid line in FIG. 6 is acquired. This regression formula represents an example of the above-described correlation. Just as described, the correlation between the diameter of the artificial flaw 5 and the corrosion growth rate can be calculated experimentally in advance or can be calculated probatively by an analytical method such as a simulation. As the correlation, information on the regression formula as indicated by the solid line in FIG. 6 may be stored in the storage section 332 and used for the correction.

Alternatively, information on a correction coefficient that is calculated by the regression formula as illustrated in FIG. 6 and corresponds to the diameter of the specified artificial flaw 5 may be stored in the storage section 332 and used for the correction. For example, in the example illustrated in FIG. 6, the correction coefficient is an index of the corrosion growth rate in the regression formula corresponding to the diameter of the specified artificial flaw 5. More specifically, for example, in FIG. 6, the correction coefficient is 1 when the diameter of the artificial flaw 5 is 1 mm, and the correction coefficient is 1.5 when the diameter of the artificial flaw 5 is 0.4 mm. Such a correction coefficient may be calculated every 0.1 mm of the diameter of the artificial flaw 5 and used for the correction. When the correction coefficient corresponding to the diameter of the artificial flaw 5 is calculated in advance as the correlation, the correction can easily be made. In this way, it is possible to conduct the highly-reliable and versatile anticorrosion test with a simple configuration.

As a specific example, it is assumed that the diameter of the artificial flaw 5, which is measured in the first measurement step S2, is 0.4 mm and the corrosion growth rate, which is calculated in the calculation step S6, is 1.5 mm/h. In addition, the correction coefficient is adopted as the correlation, and it is assumed that, for example, the correction coefficients at the time when the diameter of the artificial flaw 5 is 1 mm and 0.4 mm are 1 and 1.5, respectively. In this case, based on information that the diameter of the artificial flaw 5 is 0.4 mm and information that the correction coefficient is 1.5 at the time when the diameter of the artificial flaw 5 is 0.4 mm, which is read from the storage section 332, the arithmetic section 331 divides a value of the corrosion growth rate 1.5 mm/h by the correction coefficient 1.5 and thereby corrects such a value to 1 mm/h.

When such correction step S7 is provided, the degree of the progress of the corrosion of the coated metallic material can be evaluated with the high degree of accuracy regardless of the size of the artificial flaw 5, in which the cathode reaction progresses, prior to the energization. In this way, it is possible to improve the reliability and the versatility of the anticorrosion test.

The post-correction corrosion growth rate, which is acquired in the correction step S7, can be used to evaluate the corrosion resistance of the coated metallic material 1 in the actual corrosion test. More specifically, for example, a relationship between the post-correction corrosion growth rate, which is acquired by the anticorrosion test, and the corrosion growth rate, which is acquired by the actual corrosion test, is calculated in advance. Then, based on the result of the anticorrosion test, it is possible to confirm such a degree that the corrosion resistance in the anticorrosion test corresponds to that in the actual corrosion test.

Experiment Example

—Anticorrosion Test—

As illustrated in Table 1, as test materials (the coated metallic materials), three types of the test materials with the different coating materials for the electrodeposition coating film 4 and different electrodeposition baking conditions were prepared.

TABLE 1

|  | Test material | | |
| --- | --- | --- | --- |
|  | 1 | 2 | 3 |
| Electrodeposition baking condition | 140° C. × 15 minutes | 160° C. × 10 minutes | 140° C. × 20 minutes |
| Diameter of artificial flaw (mm) | 1 | 0.2 | 0.2 |
|  | — | — | 0.42 |
|  | — | 0.6 | 0.6 |
|  | — | — | 1 |
|  | — | 1.5 | 1.5 |
| Temperature (° C.) | 50 | 65 | 65 |
| Holding time (minute) | 0 | 30 | 30 |
| Energization time (hour) | 5 | 0.5 | 0.5 |

In each of the test materials 1 to 3, the metallic base material is the steel sheet 2, the chemical film is zinc phosphate, a chemical conversion coating time is 120 seconds, and a thickness of the electrodeposition coating film 4 is 10 μm. The anticorrosion test was conducted for each of the test materials in the manner illustrated in FIG. 1.

In each of the test materials 1 to 3, the Vickers hardness tester was used to form the artificial flaws 5 at the two positions, each of which reached the steel sheet 2 and had the same diameter, with a distance of 4 cm therebetween. More specifically, as illustrated in Table 1, the artificial flaw 5 having the diameter of 1 mm was formed at the two positions in the test material 1. In regard to the test material 2, the artificial flaw 5 having the diameter of each of 0.2 mm, 0.6 mm, and 1.5 mm was formed at the two positions to prepare three types of samples. In regard to the test material 3, the artificial flaw 5 having the diameter of each of 0.2 mm, 0.42 mm, 0.6 mm, 1 mm, and 1.5 mm was formed at the two positions to prepare five types of samples.

In the anticorrosion test of the test material 1, simulated clay was produced by mixing 50 g of sodium chloride as the supporting electrolyte and 500 g of kaolinite as the clay mineral with 1.3 L of water and was used as the water-containing material 6. In the anticorrosion tests of the test materials 2, 3, the simulated clay was produced by mixing 50 g of sodium chloride, 50 g of calcium chloride, and 50 g of sodium sulfate as the supporting electrolytes and 1000 g of kaolinite as the clay mineral with 1.2 L of water and was used as the water-containing material 6.

As the electrode 12, a ring-shaped perforated electrode (made of platinum) having approximately 12 mm of an outer diameter and approximately 10 mm of an inner diameter was used.

In the anticorrosion test of the test material 1, the hot plate was arranged on the lower side of the steel sheet 2, the rubber heater was wrapped around the cylinder 11, and the temperatures of the steel sheet 2 and the water-containing material 6 were increased to 50° C. In the anticorrosion tests of each of the test materials 2, 3, the hot plate was arranged on the lower side of the steel sheet 2, and the temperatures of the steel sheet 2 and the water-containing material 6 were increased to 65° C.

The current value of the energization means 8 was set at 1 mA. The test material 1 was energized immediately after the connection step (the holding time: 0 minute). Each of the test materials 2, 3 was held for 30 minutes and energized after the connection step (the holding time: 30 minutes). The energization time was 5 hours for the test material 1 and 0.5 hour for the test materials 2, 3.

After the termination of the energization, the images of the test material 1 in FIG. 5 were captured. In regard to the test materials 2, 3, the corrosion growth rate illustrated in FIG. 6 in each of the test materials was calculated by the above-described method.

Second Embodiment

A detailed description will hereinafter be made on other embodiments according to the present disclosure. In the description of these embodiments, the same portions as those in the first embodiment will be denoted by the same reference signs and numerals, and the detailed description thereon will not be made.

In the first embodiment, the energization in the energization step S4 is of a constant current control type. However, the energization in the energization step S4 may be of a constant voltage control type.

Figure 7:
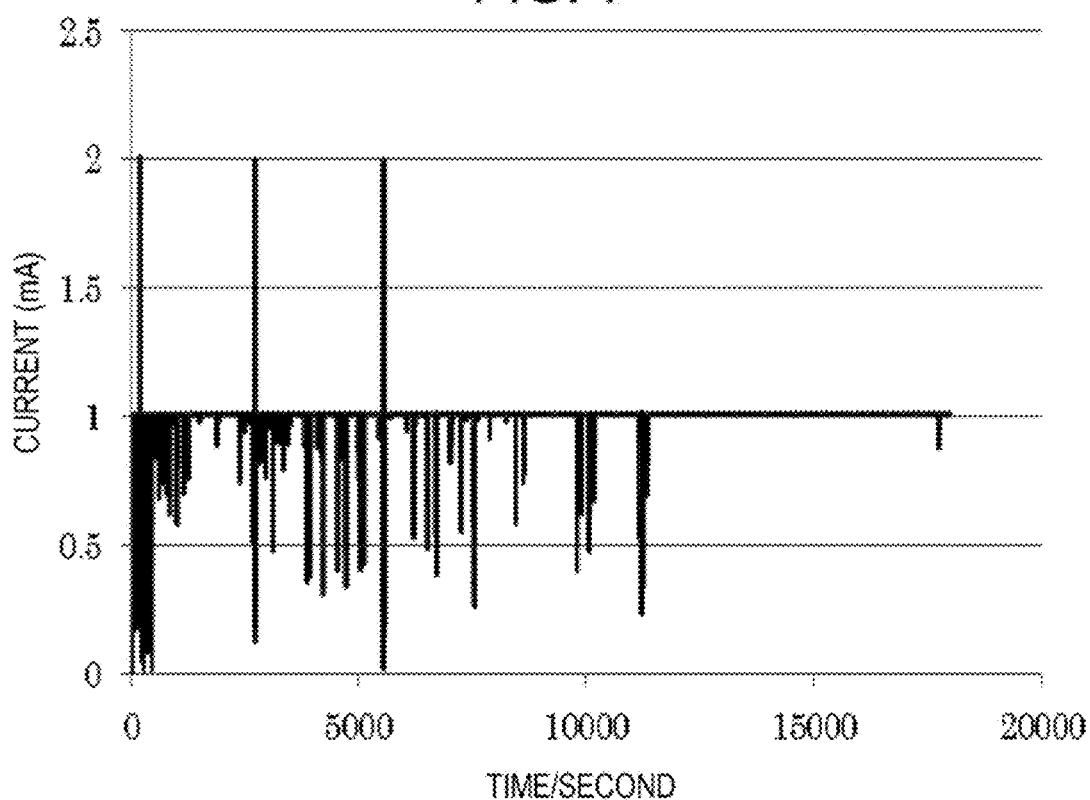
FIG. 7 is a current plot chart at the time of constant current energization control in the anticorrosion test according to one embodiment of the present disclosure.
Figure 8:
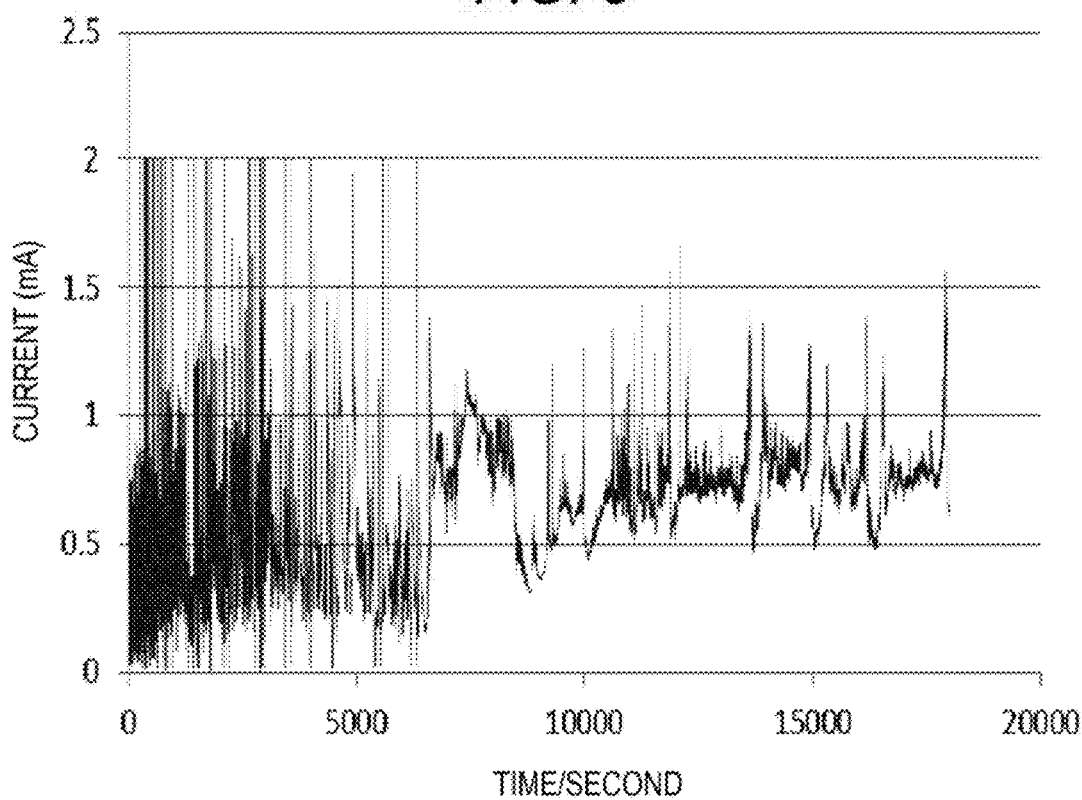
FIG. 8 is a current plot chart at the time of constant voltage energization control in an anticorrosion test of according to one embodiment of the present disclosure.

More specifically, in FIG. 7, the current for the energization by the constant current control at 1 mA in the first embodiment is plotted (the test of the test material 1), and in FIG. 8, the current at the time when a constant voltage is applied is plotted, and the constant voltage is in such a magnitude that the current at 1 mA flows. In this anticorrosion test with the constant current control and this anticorrosion test with the constant voltage control, test conditions other than the energization condition are the same as the test conditions for the anticorrosion test of the test material 1 in the first embodiment.

In the case of the constant current control, although the current value fluctuates to a certain extent at an initial period of the energization, the current value is controlled at approximately 1 mA. When the current value that has direct correlation with the acceleration of the corrosion is stabilized, just as described, reproducibility of the acceleration of the corrosion is improved. That is, the reliability of the anticorrosion test is improved.

Meanwhile, in the case of the constant voltage control, the current value fluctuates significantly. Thus, it is understood that such fluctuations are disadvantageous in terms of the reproducibility of the acceleration of the corrosion. A period from initiation of the energization to about 7000 seconds in which the current value fluctuates significantly corresponds to a period in which water permeates the coating film and in which the permeation of water into the electrodeposition coating film 4 does not progress steadily. Thus, in such a period, it is confirmed that the current value fluctuates significantly. Thereafter, the current value fluctuates within a range of 0.5 mA to 1.5 mA, and it is recognized that such fluctuations are influenced by deterioration of the chemical film and fluctuations in a resistance value due to rusting. In the connection step, in the case where the water-containing material 6 is held in the state of being arranged on the surface of the electrodeposition coating film 4 for a specified time, the fluctuations in the current value from the initiation of the energization to about 7000 seconds can be suppressed. It is considered that the state of the progress of the corrosion or the degree of the corrosion in the process of the growth of the corrosion can be comprehended from the plotted current values in the constant voltage control (a current wave form).

Other Embodiments

In the above embodiment, it is configured that the electrodeposition coating film 4 is provided as the surface-treated film. However, the coated metallic material 1 can be configured to include two or more of multi-layers as surface-treated film. More specifically, for example, the multi-layers can be configured to include, in addition to the electrodeposition coating film 4, a middle coating film on the surface of the electrodeposition coating film 4 or can be configured to further include, in addition to the electrodeposition coating film 4, a top coating film and the like on the middle coating film.

The middle coating film has roles of securing finish quality and an anti-chipping property of the coated metallic material 1 and improving adhesiveness between the electrodeposition coating film 4 and the top coating film.

The top coating film secures color, the finish quality, and anti-weatherability of the coated metallic material 1. More specifically, each of these coating films can be formed by a coating material that contains a base resin, such as a polyester resin, an acrylic resin, or alkyd, and a crosslinking agent, such as a melamine resin, a urea resin, a polyisocyanate compound (including a block), or the like, for example.

With this configuration, in a manufacturing process of an automotive member or the like, for example, it is possible to take a part from a production line per coating process so as to check quality and the like of the coating film.

In addition, in the above embodiment, the water-containing material 6 is configured to contain the clay mineral as a constituent having the function of promoting the permeation of water into the electrodeposition coating film 4. However, as long as the constituent has a similar function, the constituent is not limited to the clay mineral. More specifically, for example, the water-containing material 6 may include a solvent such as acetone, ethanol, toluene, or methanol, a substance that improves wettability of the coating film, and the like.

In the above embodiment, the electrode 12 is the perforated electrode having the through hole 12a. However, the electrode 12 may be an electrode without the through hole 12a. In addition, the shape of the electrode is not particularly limited. An electrode in a shape that is generally used for electrochemical measurement can be adopted.

The anticorrosion test equipment 30 in the above embodiment is configured to include the controller 33 that is connected to the energization means 8 and the camera 31 electrically or wirelessly. However, the anticorrosion test method according to the present disclosure can be executed by another method. More specifically, for example, a user may cause another computer to read the information on the current value, the energization time, and the like of the energization means 8 and the image data acquired by the camera 31 and to execute the processing.

INDUSTRIAL APPLICABILITY

The present disclosure can provide the anticorrosion test method and the anticorrosion test equipment for the coated metallic material, each of which is simple, highly reliable, and versatile. Therefore, such a method and such equipment are extremely useful.

DESCRIPTION OF REFERENCE SIGNS AND NUMERALS

1 Coated metallic material
2 Steel sheet (metallic base material)
3 Chemical film (metallic base material)
4 Electrodeposition coating film (surface-treated film)
5 Artificial flaw
6 Water-containing material
7 External circuit
8 Energization means
12 Electrode
12a Through hole
30 Anticorrosion test equipment
31 Camera (first measurement means, second measurement means, detection means)
33 Controller
331 Arithmetic section (first measurement means, second measurement means, calculation means, correction means)
332 Storage section
333 Control section

The invention claimed is:
1. An anticorrosion test method for a coated metallic material in which a resin coating film is provided to a metallic base material, the anticorrosion test method for the coated metallic material comprising:
  a preparation step of adding artificial flaws that penetrate the resin coating film and reach the metallic base material at two mutually-separated positions in the coated metallic material;
  a first measurement step of measuring a size of one of the artificial flaws;
  a connection step of electrically connecting the artificial flaws at the two positions by an external circuit via water-containing materials, each of the water-containing materials being in contact with respective one of the artificial flaws;
  an energization step of energizing the metallic base material by the external circuit so as to produce a bulge of the resin coating film in at least one of the artificial flaws at the two positions;
  a second measurement step of measuring a size of the bulge of the resin coating film;
  a calculation step of calculating a degree of progress of corrosion of the coated metallic material in relation to one of the artificial flaws at the two positions having the larger bulge of the resin coating film on the basis of the size of the artificial flaw, which is measured in the first measuring step, and the size of the bulge of the resin coating film, which is measured in the second measurement step; and a correction step of correcting the degree of the progress of the corrosion of the coated metallic material, which is calculated in the calculation step, on the basis of the size of the artificial flaw having the larger bulge of the resin coating film and a previously calculated correlation between the size of the artificial flaw and the degree of the progress of the corrosion of the coated metallic material.

2. The anticorrosion test method for the coated metallic material according to claim 1, wherein
in the energization step, one of the artificial flaws at the two positions is an anode site, and the other one of the artificial flaws at the two positions is a cathode site, and
the artificial flaw having the larger bulge of the resin coating film is the artificial flaw that is the cathode site.

3. The anticorrosion test method for the coated metallic material according to claim 2, wherein
the degree of the progress of the corrosion is a growth rate of the bulge of the resin coating film, and
in the calculation step, the growth rate of the bulge of the resin coating film is calculated on the basis of the size of the artificial flaw, which is measured in the first measuring step, the size of the bulge of the resin coating film, which is measured in the second measurement step, and energization information in the energization step in relation to one of the artificial flaws at the two positions having the larger bulge of the resin coating film.

4. The anticorrosion test method for the coated metallic material according to claim 3, wherein
a shape of the artificial flaw having the larger bulge of the resin coating film is a dot shape in a plan view, and a ratio between a maximum width and a minimum width of the dot shape is 2 or less.

5. The anticorrosion test method for the coated metallic material according to claim 4, wherein
in the first measurement step, a diameter of the artificial flaw is measured as the size of the artificial flaw.

6. The anticorrosion test method for the coated metallic material according to claim 5, wherein
the diameter of the artificial flaw is equal to or larger than 0.1 mm and equal to or smaller than 5 mm.

7. The anticorrosion test method for the coated metallic material according to claim 2, wherein
a shape of the artificial flaw having the larger bulge of the resin coating film is a dot shape in a plan view, and a ratio between a maximum width and a minimum width of the dot shape is 2 or less.

8. The anticorrosion test method for the coated metallic material according to claim 1, wherein
the degree of the progress of the corrosion is a growth rate of the bulge of the resin coating film, and
in the calculation step, the growth rate of the bulge of the resin coating film is calculated on the basis of the size of the artificial flaw, which is measured in the first measuring step, the size of the bulge of the resin coating film, which is measured in the second measurement step, and energization information in the energization step in relation to one of the artificial flaws at the two positions having the larger bulge of the resin coating film.

9. The anticorrosion test method for the coated metallic material according to claim 8, wherein
a shape of the artificial flaw having the larger bulge of the resin coating film is a dot shape in a plan view.

10. The anticorrosion test method for the coated metallic material according to claim 9, wherein
in the first measurement step, a diameter of the artificial flaw is measured as the size of the artificial flaw.

11. The anticorrosion test method for the coated metallic material according to claim 1, wherein
a shape of the artificial flaw having the larger bulge of the resin coating film is a dot shape in a plan view, and a ratio between a maximum width and a minimum width of the dot shape is 2 or less.

12. The anticorrosion test method for the coated metallic material according to claim 11, wherein
in the first measurement step, a diameter of the artificial flaw is measured as the size of the artificial flaw.

13. The anticorrosion test method for the coated metallic material according to claim 1, wherein
the water-containing materials comprise water, a supporting electrolyte, and a clay mineral.

14. The anticorrosion test method for the coated metallic material according to claim 1, wherein
a distance between the artificial flaws at the two mutually-separated positions is equal to or longer than 2 cm.

15. An anticorrosion test equipment for a coated metallic material in which a resin coating film is provided to a metallic base material, the anticorrosion test equipment for the coated metallic material comprising:
an external circuit configured to electrically connect artificial flaws, which are artificially added at two mutually-separated positions in the coated metallic material, penetrate the resin coating film, and reach the metallic base material, via water-containing materials, each of the water-containing materials being in contact with respective one of the artificial flaws;
an energization instrument configured to energize the metallic base material by the external circuit so as to produce a bulge of the resin coating film in at least one of the artificial flaws at the two positions;
a first measurement instrument configured to measure a size of one of the artificial flaws;
a second measurement instrument configured to measure a size of the bulge of the resin coating film;
circuitry configured to calculate a degree of progress of corrosion of the coated metallic material in relation to one of the artificial flaws at the two positions having the larger bulge of the resin coating film on the basis of the size of the artificial flaw, which is measured by the first measurement instrument, and the size of the bulge of the resin coating film, which is measured by the second measurement instrument; and
the circuitry further configured to correct the calculated degree of the progress of the corrosion of the coated metallic material, on the basis of the size of the artificial flaw having the larger bulge of the resin coating film and a previously calculated, correlation between the size of the artificial flaw and the degree of the progress of the corrosion of the coated metallic material.

16. The anticorrosion test equipment for the coated metallic material according to claim 15, wherein
the correlation is a correction coefficient that corresponds to the size of the artificial flaw.

* * * * *